United States Patent [19]

Ogawa

[11] Patent Number: 5,114,225
[45] Date of Patent: May 19, 1992

[54] APPARATUS FOR VARYING ACCEPTANCE ANGLE OF CAMERA

[75] Inventor: Kimiaki Ogawa, Tokyo, Japan

[73] Assignee: Asahi Kogaku Kogyo Kabushiki Kaisha, Tokyo, Japan

[21] Appl. No.: 501,844

[22] Filed: Mar. 30, 1990

[30] Foreign Application Priority Data

Apr. 5, 1989 [JP] Japan .................. 1-86625

[51] Int. Cl.⁵ .............................. G03B 7/099
[52] U.S. Cl. .................. 354/481; 354/149.1
[58] Field of Search .......... 384/481, 195.12; 354/149.1, 131

[56] References Cited

U.S. PATENT DOCUMENTS

| Re. 32.797 | 12/1988 | Harvey | 354/481 |
| 3,000,281 | 9/1961 | Rentschler | 354/447 |
| 3,272,103 | 9/1966 | Ploke | 354/481 |
| 4,049,996 | 9/1977 | Vital et al. | 354/131 |
| 4,673,282 | 6/1987 | Sogame | 355/14 E |
| 4,777,508 | 10/1988 | Aoshima | 354/481 |
| 4,847,647 | 7/1989 | Ueda | 354/149.1 |
| 4,914,461 | 4/1990 | Hori | 354/149.1 |

FOREIGN PATENT DOCUMENTS 991061 5/1965 United Kingdom .
1590979 6/1981 United Kingdom .

Primary Examiner—L. T. Hix
Assistant Examiner—David M. Gray
Attorney, Agent, or Firm—Sandler, Greenblum & Bernstein

[57] ABSTRACT

A camera having a variable focal length lens, a strobe unit and a light receiver which receives light reflected from an object to be photographed is disclosed. An acceptance angle varying apparatus includes an acceptance angle varying device for varying the acceptance angle of the light receiver in accordance with the focal length of the variable focal length lens and a drive for moving the acceptance angle varying device in association with the focal length of the variable focal length lens.

22 Claims, 4 Drawing Sheets

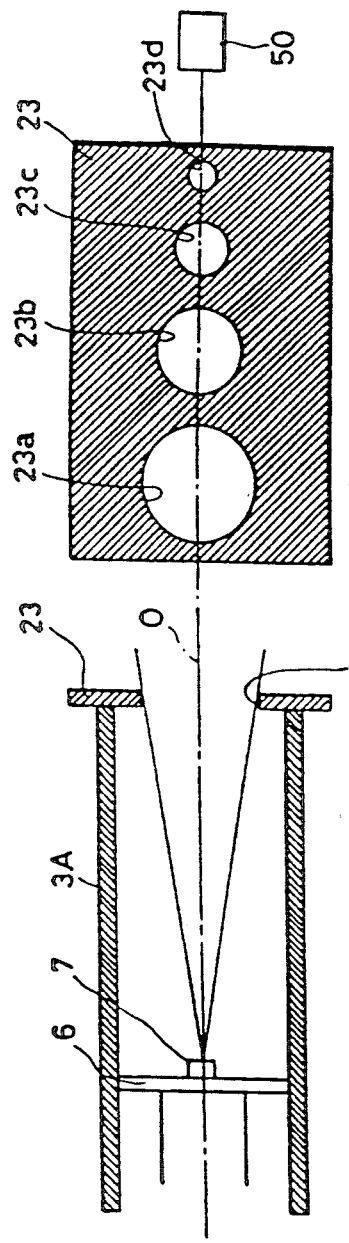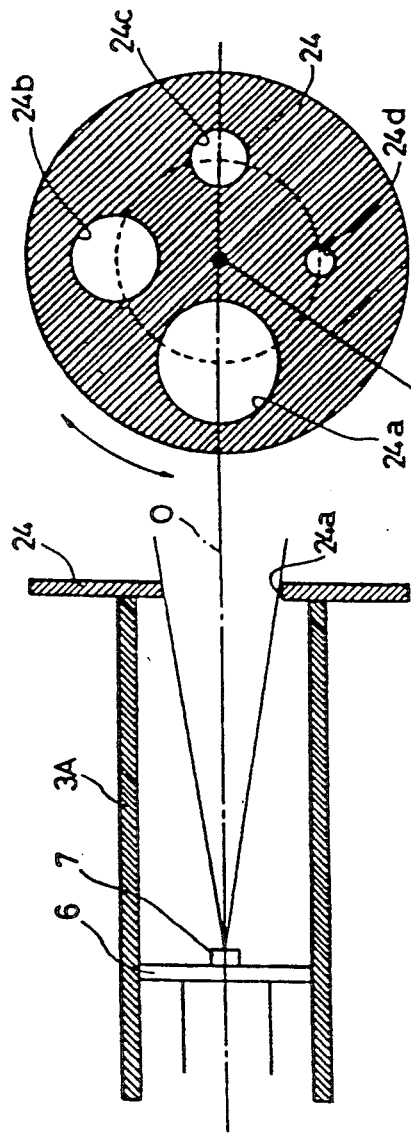

PRIOR ART

WIDE ↑

TELE ↓

APPARATUS FOR VARYING ACCEPTANCE ANGLE OF CAMERA

BACKGROUND OF THE INVENTION

1. Field of the Invention

The present invention relates to an apparatus for varying an acceptance angle of a light receiver which receives light reflected from an object to be photographed in a camera.

2. Description of the Related Art

In an external light control type of auto strobe which is incorporated in a camera body or detachably attached to a camera body, a light receiving device (light receiver) is provided at a predetermined position of the camera body or the strobe. In such a conventional auto strobe, light emitted from a light emitter and reflected by an object to be photographed is received by the light receiver, so that when the quantity of light received by the light receiver has a predetermined value, the emission of strobe light is stopped to control the quantity of illuminating light (exposure).

However, in the conventional auto strobe, the acceptance angle of the light receiver is constant. Accordingly, in a camera having a focal length varying lens, such as a zoom lens, in which the auto strobe is incorporated, when the focal length is changed, for example from a shortest focal length (WIDE extremity) to an intermediate focal length (standard) or to a longest focal length (TELE extremity) during zooming, the actual photographing range (angle of view) gradually decreases, as shown at 1A, 1B and 1C in FIGS. 7A, 7B and 7C.

However, the light receiving range (acceptance angle) 2 at the respective focal lengths does not vary and is constant.

Therefore, if the light receiving range 2 is set to be optimum at the standard focal length (standard photographing range 1B), the light receiving range 2 at the WIDE extremity is too small to cover the wide photographing range 1A, and conversely, the light receiving range 2 at the TELE extremity is extremely large for the tele photographing range 1C, thus resulting in a reduced precision of light adjustment for a main object in either case.

SUMMARY OF THE INVENTION

The primary object of the present invention is to provide an acceptance angle varying apparatus in which a ratio of an acceptance angle to the angle of view of a light receiver or a ratio of a light receiving surface area to a photographing picture plane is substantially constant, regardless of a change of the angle of view or the photographing picture plane when the focal length of the photographing lens is changed.

In a camera having a focal length varying lens and a light receiver which receives light reflected from an object to be photographed, the acceptance angle varying apparatus of the present invention is characterized by an acceptance angle varying means for varying the acceptance angle of the light receiver in accordance with the focal length of the focal length varying lens.

When the focal length of the photographing lens is changed while taking pictures, the acceptance angle is changed in accordance with the focal length, and accordingly, the light receiver can receive light reflected from the object which occupies a predetermined area of the picture plane. Consequently, the distance of an object which occupies a predetermined area at a constant position in the picture plane can be detected, regardless of the focal length.

Furthermore, if the acceptance angle varying apparatus of the present invention is applied to a photometer of an auto strobe, since the quantity of strobe light (illuminating light) for the object which is located within a predetermined area of the picture plane can be precisely controlled, a picture of the main subject can be taken at an optimum exposure.

The acceptance angle varying means can be realized by a mechanism for varying a distance between an aperture and the light receiver or by a mechanism for varying the size of the aperture.

BRIEF DESCRIPTION OF THE DRAWINGS

The invention will be described below in detail with reference to the accompanying drawings, in which:

FIGS. 5A and 5B are a side elevational view and a front elevational view of an acceptance angle varying apparatus which has a slide plate having a plurality of circular holes located side by side, according to a third embodiment of the present invention, respectively;

FIGS. 6A and 6B are a side elevational view and a front elevational view of an acceptance angle varying apparatus which has a rotational plate having a plurality of circular holes of different diameters which are circumferentially spaced from one another, according to a fourth embodiment of the present invention, respectively; and, FIGS. 7A, 7B and 7C are schematic views showing relationships between the angle of view and the acceptance angle in a known photometer.

DESCRIPTION OF PREFERRED EMBODIMENTS

Figures 1A, 1B:
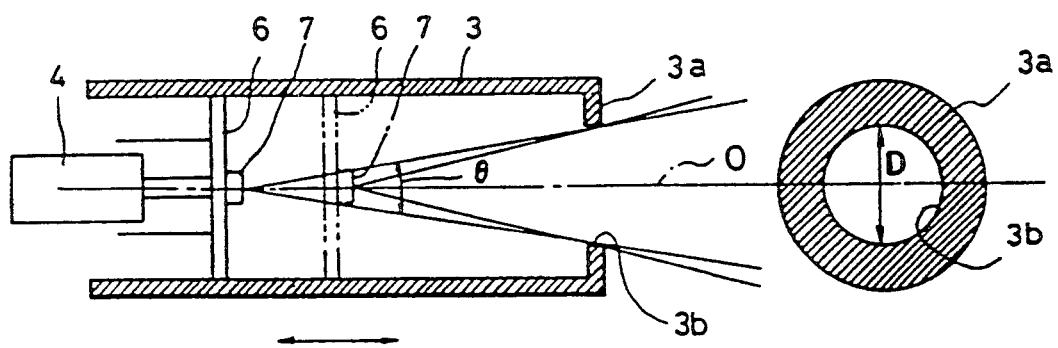
FIGS. 1A and 1B are a side elevational view and a front elevational view of an acceptance angle varying apparatus according to a first embodiment of the present invention, respectively.

FIGS. 1A and 1B show a first embodiment of an acceptance angle varying apparatus of the present invention. In FIGS. 1A and 1B, a cylindrical light receiver accommodating barrel 3 has therein a supporting plate 6 which is slidable in the directions A by a driving member 4. The supporting plate 6 has at its center a light receiving device (light receiver) 7 supported thereon.

A radially extending inner flange 3a is formed at the front end of the cylindrical light receiver accommodating barrel 3. The inner peripheral edge of the inner flange 3a defines a circular aperture (opening) 3b having a predetermined diameter D. The acceptance angle $\theta$ of the light receiver 7 is determined by the distance between the circular opening 3b and the supporting plate 6 (light receiver 7). Namely, the acceptance angle $\theta$ increases as the distance between the circular opening 3b and the supporting plate 6 becomes small and vice versa. Namely, the acceptance angle θ can be controlled by the linear displacement of the slidable supporting plate 6. The light receiver accommodating barrel 3, the circular opening 3b, the driving member 4 and the supporting plate 6 constitute an acceptance angle varying means.

The center axis of the circular opening 3b is coincidental with the optical axis 0 of the optical system of the apparatus. The inner peripheral surface of the light receiver accommodating barrel 3 is subject to an antireflection surface treatment.

Figure 2:
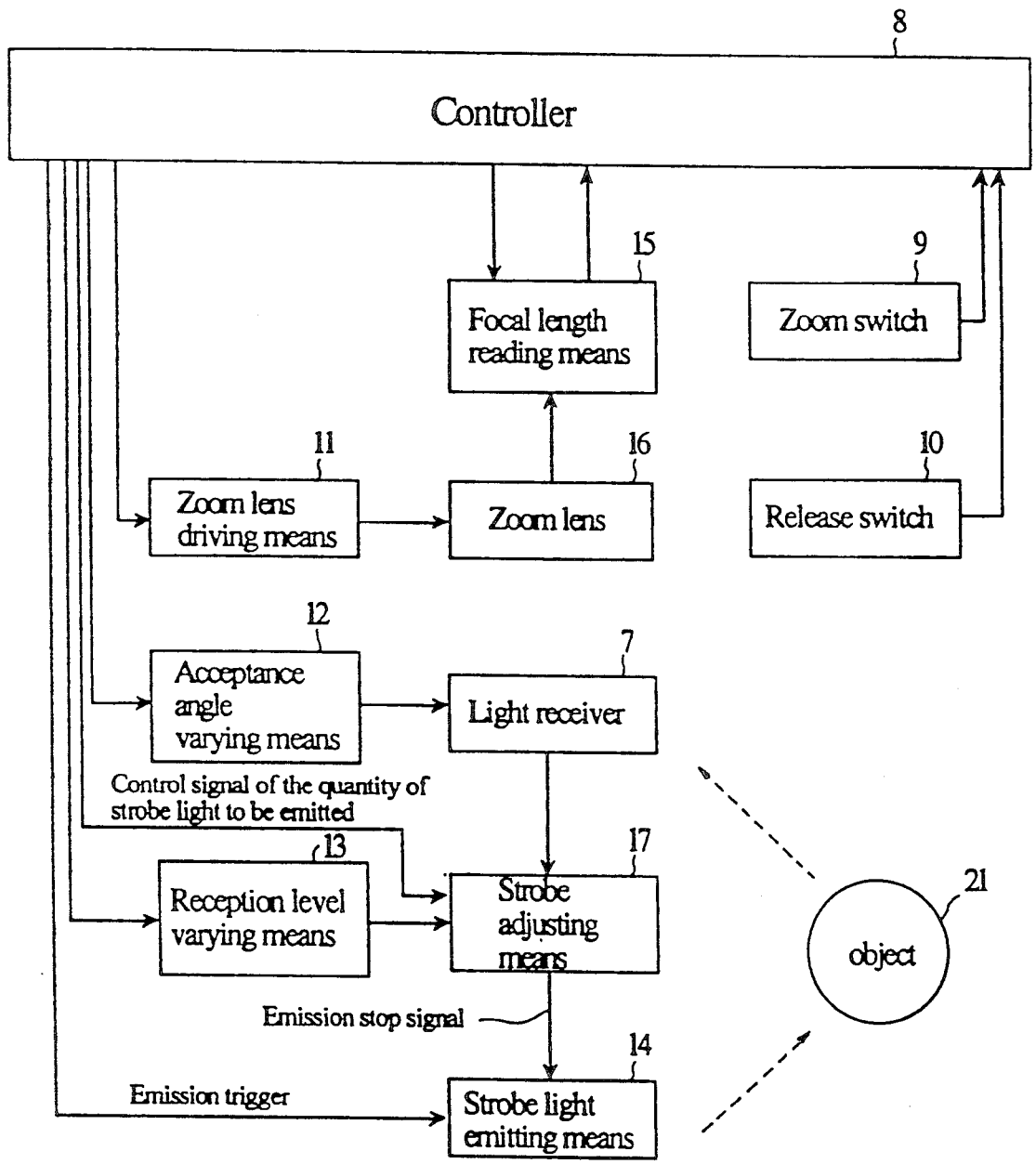
FIG. 2 is a block diagram of a control system of an acceptance angle varying apparatus shown in FIGS. 1A and 1B, which is incorporated in a camera.

The control system of a camera which incorportes therein a power zoom lens and to which the first embodiment of the present invention as set forth above will be described below in detail with reference to the FIG. 2.

A zoom switch 9 and a release switch 10 are connected to input ports of a controller 8 which is a microcomputer. To the output ports of the controller 8 are connected a zoom lens driving means 11, an acceptance angle varying means 12 for moving the light receiver 7 to vary the acceptance angle θ, a reception level varying means 13 for varying the light reception level in accordance with the acceptance angle θ, and a strobe light emitting means 14. The acceptance angle varying means 12 is constituted by the light receiver accommodating barrel 3, the circular opening 3b, the driving member 4 and the supporting member 6, in the first embodiment shown in FIGS. 1A and 1B.

The controller 8 is connected to a focal length reading means 15 which reads focal length data of the zoom lens 16 as a focal length varying lens. The focal length reading means 15 reads position data of a variable power lens (not shown) of the zoom lens 16 which is driven by the zoom lens driving means 11 to input the data thus read to the controller 8. The controller 8 stores therein focal length data corresponding to the position data, etc., so that the position data can be converted to the focal length data or the like in the controller 8.

The controller 8 drives the acceptance angle varying means 12 so as to obtain an optimum acceptance angle corresponding to the converted focal length data, during the zooming operation of the zoom lens 16. Namely, in the first embodiment illustrated in FIGS. 1A and 1B, the light receiver 7 is linearly moved in the optical axis direction by the driving member 4 to vary the distance of the light receiver 7 from the circular opening 3b.

When the release switch 10 is depressed, the controller 8 outputs the light emission trigger, the reception level signal and the control signal for the quantity of the strobe light to be emitted, to the strobe light emitting means 14, the reception level varying means 13 and the strobe light adjusting means 17, respectively under the condition where emission of strobe light is required.

The reception level varying means 13 outputs a correction signal to the strobe light adjusting means 17 to correct the output signal level of the light receiver 7 in accordance with the acceptance angle θ. The strobe light adjusting means 17 outputs an emission stop signal to the strobe light emitting means 14 to stop the emission of the strobe light in response to the output signals of the controller 8, the reception level varying means 13 and the light receiver 7. Note that numeral 21 designates an subject to be photographed.

In the illustrated embodiment, when the zoom switch 9 is moved to the TELE side or the WIDE side by a photographer, the zoom lens driving means starts and causes the zoom lens 16 to commence the zooming operation. The position data of the variable power lens of the zoom lens 16 (i.e. the focal length data) is read by the controller 8 through the focal length reading means 15.

Figure 3A:
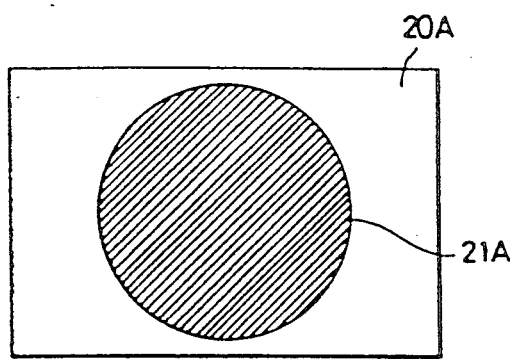
FIGS. 3A, 3B and 3C are schematic views showing different acceptance angles for different angles of view.
Figure 7A:
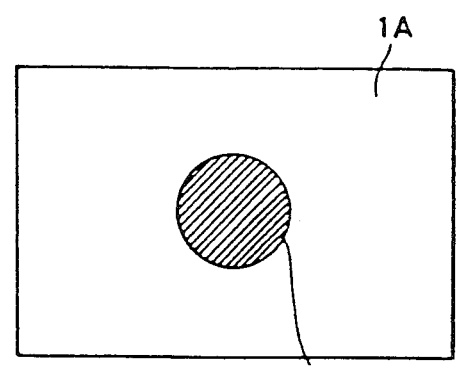
Figure 3B:
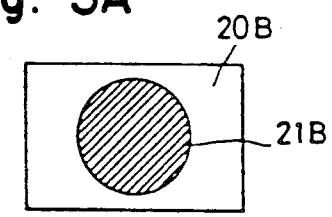
Figure 7B:
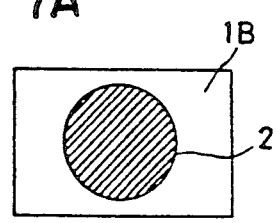

The acceptance angle varying means 12 moves the light receiver 7 in the directions A shown at the arrow in FIG. 1A, in accordance with the focal length read by the controller 8 through the driving member 4 to vary the acceptance angle θ. In this case, if the zoom switch 9 is on the WIDE side, the light receiver 7 is moved by the driving member 4 in the right hand direction in FIG. 1A to come close to the circular opening 3b to reduce the distance between the light receiver 7 and the circular opening 3b, to thereby increase the acceptance angle θ. As a result, the light receiving area 21A (i.e. the acceptance angle θ) is increased in accordance with the increased photographing range (angle of view) 20A, as shown in FIG. 3A.

When the release switch 10 is turned ON, the strobe light emitting means 14 emits light and the light receiver 7 receives light reflected from the object 21 to convert the strobe light to an electrical signal, so that the electrical signal is supplied to the strobe light adjusting means 17. The strobe light adjusting means 17 outputs an emission stop signal as soon as the illumination of the strobe light reaches a predetermined quantity of exposure in accordance with the electrical signal. Upon receipt of the emission stop signal, the strobe light emitting means 14 stops the emission of strobe light.

Figure 3C:
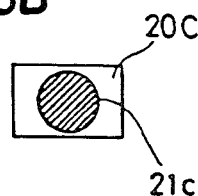
Figure 7C:
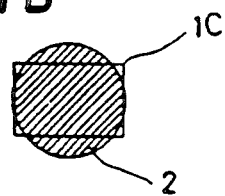

When the zoom switch 9 is on the TELE side, the driving member 4 moves the light receiver 7 in the left hand direction in FIG. 1A, so that the light receiver 7 comes far away from the circular opening 3b. As a result, the distance between the light receiver 7 and the circular opening 3b is increased, and the acceptance angle θ is decreased, so that the light receiving area 21c is reduced in accordance with the decreased photographing range 20c, as shown in FIG. 3C.

The above discussion is applicable similarly to the change from the WIDE extremity to the TELE extremity.

Thus, the strobe light which is received by the light receiver 7 is always light which is reflected from the main object within a predetermined range in the picture plane, and accordingly, the strobe light emitting means 14 can provide a predetermined quantity of light which gives an optimum exposure to the object within the constant range of the picture plane.

Although the acceptance angle varying means is realized by the slidable supporting plate 6 in the first embodiment, the invention is not limited thereto.

Figures 4A, 4B:
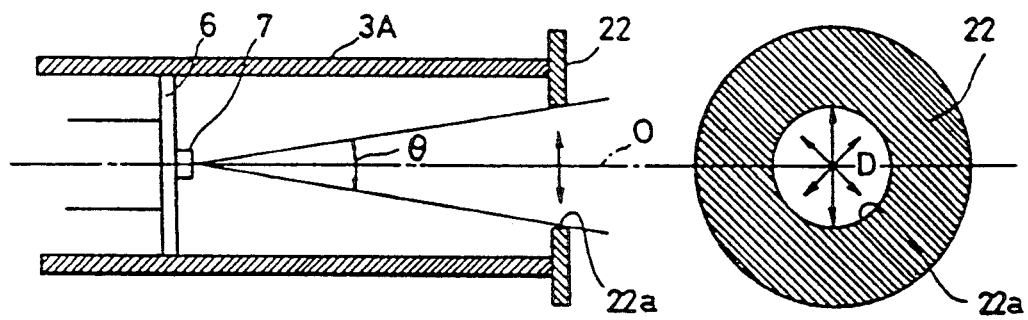
FIGS. 4A and 4B are a side elevational view and a front elevational view of an acceptance angle varying apparatus which can vary an aperture diameter, according to a second embodiment of the present invention, respectively.

FIGS. 4A and 4B show a second embodiment of the present invention.

In the second embodiment shown in FIGS. 4A and 4B, the light receiver accommodating barrel 3a has at its front end a variable aperture plate 22 which can vary the diameter D of a circular opening (aperture) 22a thereof. The diameter D of the circular opening 22a of the variable aperture plate 22 is varied in accordance with the focal length of the zoom lens 16 by a drive (not shown) to continuously vary the acceptance angle θ of the light receiver 7. As the drive of the variable aperture plate 22 can be used a known diaphragm mechanism of a camera shutter having movable blades.

FIGS. 5A and 5B show a third embodiment of the present invention. In the third embodiment illustrated in FIGS. 5A and 5B, the light receiver accommodating barrel 3A has at its front end a slidable aperture plate 23 which has a plurality of circular openings (apertures) 23a, 23b, 23c and 23d having different diameters. The circular openings 23a, 23b, 23c and 23d are laterally located side by side at a predetermined pitch along a line. The slidable aperture plate 23 is connected to an actuator 50, such as a feed screw mechanism or a linear motor, etc., so that the slidable plate 23 can be moved in the direction of the line along which the openings 23a–23d are arranged, in accordance with the focal length of the zoom lens 16. When the lateral movement of the slidable aperture plate 23 takes place, the different openings 23a–23d are selectively registered with the center of the light receiver accommodating barrel 3A to discontinuously vary the acceptance angle $\theta$ in the stepped way.

FIGS. 6A and 6B show a fourth embodiment of the present invention. In the fourth embodiment illustrated in FIGS. 6A and 6B, the light receiver accommodating barrel 3A has at its front end a rotatable aperture plate 24 which is in the form of a circular disk and which has a plurality of circular openings (apertures) 24a, 24b, 24c and 24d having different diameters. The circular openings 24a, 24b, 24c and 24d are circumferentially spaced from one another at a predetermined angular distance along an imaginary circle on the rotatable aperture plate 24. The rotatable aperture plate 24 is connected to a rotating drive, such as a motor 51, so that the rotatable aperture plate 24 can be rotated in accordance with the focal length of the zoom lens 16. The rotation of the rotatable aperture plate 24 causes the different openings 24a–24d to be selectively registered with the center of the light receiver accommodating barrel 3A, thereby to discontinuously vary the acceptance angle $\theta$ in the stepped way.

In the illustrated embodiment mentioned above, the acceptance angle $\theta$ of the light receiver for the angle of view and the shape of the openings can be optionally modified.

As can be seen from the foregoing, according to the present invention, since the acceptance angle $\theta$ of the light receiver 7 varies in accordance with the change in the angle of view (focal length) of the zoom lens 16, the position and the ratio of the surface area of the light receiving zone to the picture plane are kept substantially constant, and accordingly, an object to be photographed can be illuminated with an optimum quantity of strobe light. Namely, a picture of the subject can be taken at an optimum exposure, independently of the zooming.

In particular, the acceptance angle varying apparatus of the present invention can be advantageously used with an electronic still camera using an imaging device having a small latitude.

Although the acceptance angle of the light receiver 7 is varied by the drive which is controlled by the controller 8 in the illustrated embodiments, it is possible to vary the acceptance angle by a mechanism which is mechanically associated with the operation of the zoom lens driving means 11. Namely, for instance, a cam mechanism or a gear train can be used as the drive in the first and second embodiments, and an intermittent driving mechanism can be used in the third and fourth embodiments.

Although the above discussion has been directed to a camera having a zoom lens, the present invention can be applied also to a camera having a so-called two-focus lens or multi-focus lens.

Furthermore, the present invention can be applied not only to an strobe incorporated in a camera but also to a separate strobe unit which can be detachably attached to a camera body. In the latter case, for example, the focal length data of the lens can be supplied from the camera body side, so that the controller provided in the strobe controls the acceptance angle in accordance with the focal length data.

Although the above-mentioned embodiments are directed to a photometer for an auto strobe, the present invention can be applied to a photometer of a camera.

As can be understood from the above discussion, according to the present invention, since the ratio of the light receiving zone of the light receiver to the picture plane can be kept substantially constant by properly controlling the acceptance angle of the light receiver in accordance with the focal length of the photographing lens, a decrease in precision of adjustment of light to the main subject, which would otherwise occur due to the reception of light reflected from a subject other than the main object, does not occur.

I claim:

1. In a camera having a strobe unit and a photographing lens with a variable focal length and a strobe light receiver which receives light reflected from a subject to be photographed, an acceptance angle varying apparatus comprising:
   acceptance angle varying means for varying the acceptance angle of said strobe light receiver;
   focal length reading means for reading focal length data of the photographing lens; and
   driving means for moving said acceptance angle varying means in association with the focal length of the photographing lens.

2. An acceptance angle varying apparatus according to claim 1, wherein said acceptance angle varying means comprises a movable support to which said strobe light receiver is secured, an opening provided in front of said strobe light receiver, and said drive means moves said support to move towards and away from said opening to vary the acceptance angle of said light receiver.

3. An acceptance angle varying apparatus according to claim 1, wherein said opening is a circular opening.

4. An acceptance angle varying apparatus according to claim 3, wherein said acceptance angle varying means comprises a variable aperture member provided in front of said strobe light receiver to vary the diameter of said opening.

5. An acceptance angle varying apparatus according to claim 4, wherein said acceptance angle varying means comprises a slide plate having plurality of circular openings having different diameters positioned in front of said strobe light receiver, said slide plate being laterally movable, so that one of said circular openings can be selectively registered with said strobe light receiver to vary the acceptance angle of said strobe light receiver.

6. An acceptance angle varying apparatus according to claim 1, wherein, said acceptance angle varying means comprises a rotatable plate including a plurality of circular openings having different diameters positioned in front of said strobe light receiver, whereby, as said rotatable plate rotates, one of said circular openings can be selectively registered with said strobe light receiver to vary the acceptance angle of said strobe light receiver.

7. An acceptance angle varying apparatus according to claim 6, wherein said circular openings are circumferentially spaced from one another at a predetermined angular distance along an imaginary circle on said rotatable plate.

8. An acceptance angle varying apparatus according to claim 1, further comprising a cylindrical barrel which has an open front end and in which said strobe light receiver is accommodated.

9. An acceptance angle varying apparatus according to claim 1, wherein said photographing lens is a zoom lens.

10. An acceptance angle varying apparatus according to claim 1, further comprising a controller for driving said acceptance angle varying means in accordance with the focal length data read by said focal length reading means.

11. An acceptance angle varying apparatus according to claim 10, further comprising a level correcting means for correcting a light reception level of said strobe light receiver in accordance with the acceptance angle of said acceptance angle varying means.

12. In a camera having a photographing lens with a variable focal length lens, a light receiver which receives strobe light reflected from a subject to be photographed, an auto strobe which adjusts the quantity of light to be emitted by said strobe in accordance with the quantity of strobe light received by said light receiver, and acceptance angle varying apparatus comprising:
acceptance angle varying means for varying the acceptance angle of said light receiver;
focal length reading means for reading focal length data of the photographing lens; and
driving means for moving said acceptance angle varying means in association with the focal length of the photographing lens.

13. An acceptance angle varying apparatus according to claim 12, wherein said acceptance angle varying means comprises a support to which said light receiver is secured, an opening provided in front of said light receiver, and said drive means moves said support to move toward and away from said opening to vary the acceptance angle of said light receiver.

14. An acceptance angle varying apparatus according to claim 12, wherein said opening is a circular opening.

15. An acceptance angle varying apparatus according to claim 14, wherein said acceptance angle varying means comprises a variable aperture member provided in front of said light receiver to vary the diameter of said opening.

16. An acceptance angle varying apparatus according to claim 15, wherein said acceptance angle varying means comprises a slide plate including a plurality of circular openings having different diameters positioned in front of said light receiver, said slide plate being laterally movable, whereby one of said circular openings can be selectively registered with said light receiver to vary the acceptance angle of said light receiver.

17. An acceptance angle varying apparatus according to claim 12, wherein said acceptance angle varying means comprises a rotatable plate including a plurality of circular openings having different diameters positioned in front of said light receiver, whereby, as said rotatable plate rotates, one of said circular openings can be selectively registered with said light receiver to vary the acceptance angle of said light receiver.

18. An acceptance angle varying apparatus according to claim 17, wherein said circular openings are circumferentially spaced from one another at a predetermined angular distance along an imaginary circle on the rotatable plate.

19. An acceptance angle varying apparatus according to claim 12, further comprising a cylindrical barrel which has an open front end and in which said light receiver is accommodated.

20. An acceptance angle varying apparatus according to claim 12, wherein said photographing lens is a zoom lens.

21. An acceptance angle varying apparatus according to claim 12, further comprising a controller for driving said acceptance angle varying means in accordance with the focal length data read by said focal length reading means.

22. An acceptance angle varying apparatus according to claim 21, further comprising a level correcting means for correcting a light reception level of said light receiver in accordance with the acceptance angle of said acceptance angle varying means.

* * * * *

UNITED STATES PATENT AND TRADEMARK OFFICE
CERTIFICATE OF CORRECTION

PATENT NO. : 5,114,225
DATED : May 19, 1992
INVENTOR(S) : K. OGAWA

It is certified that error appears in the above-indentified patent and that said Letters Patent is hereby corrected as shown below:

At column 7, line 32 (claim 12, line 7), change "and" to ---an---.

Signed and Sealed this

Twenty-sixth Day of September, 1995

Attest:

BRUCE LEHMAN

*Attesting Officer*     *Commissioner of Patents and Trademarks*